(12) United States Patent
Xu et al.

(10) Patent No.: US 8,111,232 B2
(45) Date of Patent: Feb. 7, 2012

(54) LCD ELECTRODE ARRANGEMENT

(75) Inventors: Ming Xu, Cupertino, CA (US); Cheng Chen, Cupertino, CA (US); Shih Chang Chang, Cupertino, CA (US); Mingxia Gu, Santa Clara, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 497 days.

(21) Appl. No.: 12/413,082

(22) Filed: Mar. 27, 2009

(65) Prior Publication Data
US 2010/0245224 A1 Sep. 30, 2010

(51) Int. Cl.
G09G 3/36 (2006.01)
(52) U.S. Cl. ............................................ 345/98; 345/87
(58) Field of Classification Search ............ 345/87–102, 345/204
See application file for complete search history.

(56) References Cited

U.S. PATENT DOCUMENTS

| | | | |
|---|---|---|---|
| 4,991,115 A | 2/1991 | Guthrie et al. | |
| 5,396,351 A | 3/1995 | Gessel | |
| 5,450,222 A | 9/1995 | Sirkin | |
| 5,659,378 A | 8/1997 | Gessel | |
| 6,157,426 A | 12/2000 | Gu | |
| 6,285,431 B2 | 9/2001 | Lyu | |
| 6,433,933 B1 | 8/2002 | Gettemy | |
| 6,466,285 B1 | 10/2002 | Ichikawa | |
| 6,466,290 B2 | 10/2002 | Kim | |
| 6,536,933 B1 | 3/2003 | Gettemy et al. | |
| 6,545,862 B1 | 4/2003 | Gettemy et al. | |
| 6,603,469 B1 | 8/2003 | Gettemy et al. | |
| 6,618,044 B1 | 9/2003 | Gettemy et al. | |
| 6,642,985 B2 | 11/2003 | Kim | |
| 6,685,328 B1 | 2/2004 | Hanson et al. | |
| 6,700,560 B2 | 3/2004 | Sumiya | |
| 6,710,754 B2 | 3/2004 | Hanson et al. | |
| 6,718,115 B1 | 4/2004 | Gettemy et al. | |
| 6,741,314 B2 | 5/2004 | Song | |
| 6,859,244 B2 | 2/2005 | Kawase et al. | |
| 6,888,532 B2 | 5/2005 | Wong et al. | |

(Continued)

FOREIGN PATENT DOCUMENTS

JP 2001092382 4/2001

(Continued)

OTHER PUBLICATIONS

U.S. Appl. No. 12/415,848, filed Mar. 31, 2009, Chen et al.

(Continued)

*Primary Examiner* — Nitin Patel
(74) *Attorney, Agent, or Firm* — Fletcher Yoder PC

(57) ABSTRACT

Systems, devices, and methods for reducing direct current bias and/or enabling a simplified manner of polarity inversion in liquid crystal display (LCD) devices are provided. In accordance with one embodiment, a device may include a processor, a memory device, and a liquid crystal display having a pixel array including rows and columns of pixels. Each pixel of the pixel array may include a pixel electrode separated from a common electrode by a dielectric passivation layer, and may include a transistor to provide a data signal when the transistor is activated. The pixel array is configured such that a neutral amount of direct current bias is generated on the passivation layer when each row of pixels is activated. The common electrodes of certain pixels may be disposed above their respective pixel electrodes, while the common electrodes of certain other pixels may be disposed below their respective pixel electrodes.

25 Claims, 14 Drawing Sheets

U.S. PATENT DOCUMENTS

| | | |
|---|---|---|
| 6,919,681 B2 | 7/2005 | Cok |
| 6,924,752 B2 | 8/2005 | Gettemy et al. |
| 6,924,863 B2 | 8/2005 | Nishida |
| 6,947,017 B1 | 9/2005 | Gettemy |
| 6,965,375 B1 | 11/2005 | Gettemy et al. |
| 6,992,659 B2 | 1/2006 | Gettemy |
| 7,002,569 B1 | 2/2006 | Gettemy et al. |
| 7,006,080 B2 | 2/2006 | Gettemy |
| 7,034,802 B1 | 4/2006 | Gettemy et al. |
| 7,048,401 B2 | 5/2006 | Lee et al. |
| 7,057,579 B2 | 6/2006 | Hanson et al. |
| 7,057,698 B2 | 6/2006 | Chung |
| 7,068,256 B1 | 6/2006 | Gettemy et al. |
| 7,079,119 B2 | 7/2006 | Hanson et al. |
| 7,091,964 B2 | 8/2006 | Wong et al. |
| 7,095,387 B2 | 8/2006 | Lee et al. |
| 7,159,194 B2 | 1/2007 | Wong et al. |
| 7,167,309 B2 | 1/2007 | Saxena |
| 7,203,075 B2 | 4/2007 | Terada et al. |
| 7,248,271 B2 | 7/2007 | Credelle |
| 7,248,320 B2 | 7/2007 | Hirakata |
| 7,256,767 B2 | 8/2007 | Wong et al. |
| 7,268,775 B1 | 9/2007 | Gettemy |
| 7,304,707 B2 | 12/2007 | Son |
| 7,324,093 B1 | 1/2008 | Gettemy et al. |
| 7,339,639 B2 | 3/2008 | Nakano et al. |
| 7,342,571 B2 | 3/2008 | Fraser et al. |
| 7,348,964 B1 | 3/2008 | Gettemy et al. |
| 7,349,052 B2 | 3/2008 | Wu et al. |
| 7,362,338 B1 | 4/2008 | Gettemy et al. |
| 7,379,143 B2 | 5/2008 | Lyu |
| 7,466,373 B2 | 12/2008 | Xu et al. |
| 7,483,016 B1 | 1/2009 | Gettemy et al. |
| 7,663,617 B2 * | 2/2010 | Shin et al. ............... 345/204 |
| 2003/0098857 A1 | 5/2003 | Gettemy et al. |
| 2003/0160755 A1 | 8/2003 | Gettemy et al. |
| 2004/0046739 A1 | 3/2004 | Gettemy |
| 2004/0085503 A1 | 5/2004 | Kim |
| 2004/0196243 A1 * | 10/2004 | Masutani et al. ........... 345/96 |
| 2005/0001808 A1 * | 1/2005 | Lee ............................ 345/96 |
| 2005/0139837 A1 | 6/2005 | Lee |
| 2005/0184974 A1 | 8/2005 | Gettemy et al. |
| 2005/0212999 A1 | 9/2005 | Yang |
| 2005/0269580 A1 | 12/2005 | D'Angelo |
| 2006/0018175 A1 | 1/2006 | Liljedahl |
| 2006/0066805 A1 | 3/2006 | Grunnet-Jepsen |
| 2006/0197740 A1 | 9/2006 | Xu et al. |
| 2006/0203169 A1 | 9/2006 | Ozawa |
| 2006/0232553 A1 | 10/2006 | Wong et al. |
| 2006/0256264 A1 | 11/2006 | Yang |
| 2006/0268560 A1 | 11/2006 | Wong et al. |
| 2006/0279557 A1 | 12/2006 | Gettemy |
| 2006/0284895 A1 | 12/2006 | Marcu et al. |
| 2007/0024583 A1 | 2/2007 | Gettemy et al. |
| 2007/0052617 A1 | 3/2007 | Hanson et al. |
| 2007/0069975 A1 | 3/2007 | Gettemy et al. |
| 2007/0070272 A1 | 3/2007 | Gettemy et al. |
| 2007/0070282 A1 | 3/2007 | Shibahara |
| 2007/0115417 A1 | 5/2007 | Ge et al. |
| 2007/0139586 A1 | 6/2007 | Gu et al. |
| 2007/0152963 A1 | 7/2007 | Wong et al. |
| 2007/0216632 A1 * | 9/2007 | Lee ............................ 345/100 |
| 2007/0222927 A1 | 9/2007 | Uehara |
| 2007/0229475 A1 | 10/2007 | Gettemy et al. |
| 2007/0229749 A1 | 10/2007 | Kaneko |
| 2007/0273714 A1 | 11/2007 | Hodge et al. |
| 2007/0290989 A1 | 12/2007 | Gettemy et al. |
| 2007/0296693 A1 | 12/2007 | Wong et al. |
| 2008/0032755 A1 | 2/2008 | Fraser et al. |
| 2008/0036948 A1 | 2/2008 | Zhong et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0068321 A1 * | 3/2008 | Kim et al. ................ 345/90 |
| 2008/0068549 A1 | 3/2008 | Liao |
| 2008/0074400 A1 | 3/2008 | Gettemy et al. |
| 2008/0083569 A1 | 4/2008 | Gettemy et al. |
| 2008/0117184 A1 | 5/2008 | Gettemy |
| 2008/0121898 A1 | 5/2008 | Yin et al. |
| 2008/0137018 A1 | 6/2008 | Lin |
| 2008/0143946 A1 | 6/2008 | Wang |
| 2008/0164056 A1 | 7/2008 | Gettemy et al. |
| 2008/0180801 A1 | 7/2008 | Kobayashi |
| 2008/0186440 A1 | 8/2008 | Lim |
| 2008/0204431 A1 | 8/2008 | Chung et al. |
| 2008/0225217 A1 | 9/2008 | Wakabayashi |
| 2008/0231959 A1 | 9/2008 | Grip |
| 2008/0238813 A1 | 10/2008 | Gettemy et al. |
| 2008/0246726 A1 | 10/2008 | Gettemy |
| 2008/0259254 A1 | 10/2008 | Kikuchi |
| 2008/0303998 A1 | 12/2008 | Ohta |
| 2008/0309627 A1 | 12/2008 | Hotelling et al. |
| 2008/0309633 A1 | 12/2008 | Hotelling et al. |
| 2009/0009442 A1 | 1/2009 | Galbraith, Jr. et al. |
| 2009/0096760 A1 * | 4/2009 | Ma et al. ................ 345/174 |
| 2009/0309821 A1 * | 12/2009 | Tanno ..................... 345/87 |
| 2009/0322666 A1 * | 12/2009 | Hsu ........................ 345/96 |
| 2010/0053043 A1 * | 3/2010 | Sakamoto ................ 345/77 |
| 2011/0018790 A1 * | 1/2011 | Lee ........................ 345/87 |

FOREIGN PATENT DOCUMENTS

| | | |
|---|---|---|
| KR | 2004061426 | 7/2004 |
| WO | WO 2008077261 | 7/2008 |

OTHER PUBLICATIONS

U.S. Appl. No. 12/236,066, filed Sep. 23, 2008, Gettemy et al.
U.S. Appl. No. 12/371,284, filed Feb. 13, 2009, Chang et al.
U.S. Appl. No. 12/371,316, filed Feb. 13, 2009, Chang et al.
U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,368, filed Feb. 13, 2009, Chen et al.
U.S. Appl. No. 12/371,380, filed Feb. 13, 2009, Chen et al.
U.S. Appl. No. 12/371,409, filed Feb. 13, 2009, Xu et al.
U.S. Appl. No. 12/371,452, filed Feb. 13, 2009, Chang et al.
Jung, Byunghoo, et al.; "Improved Aperture Ratio Through Asymmetric Pixel Electrode Design"; Feb. 13, 1997.

* cited by examiner

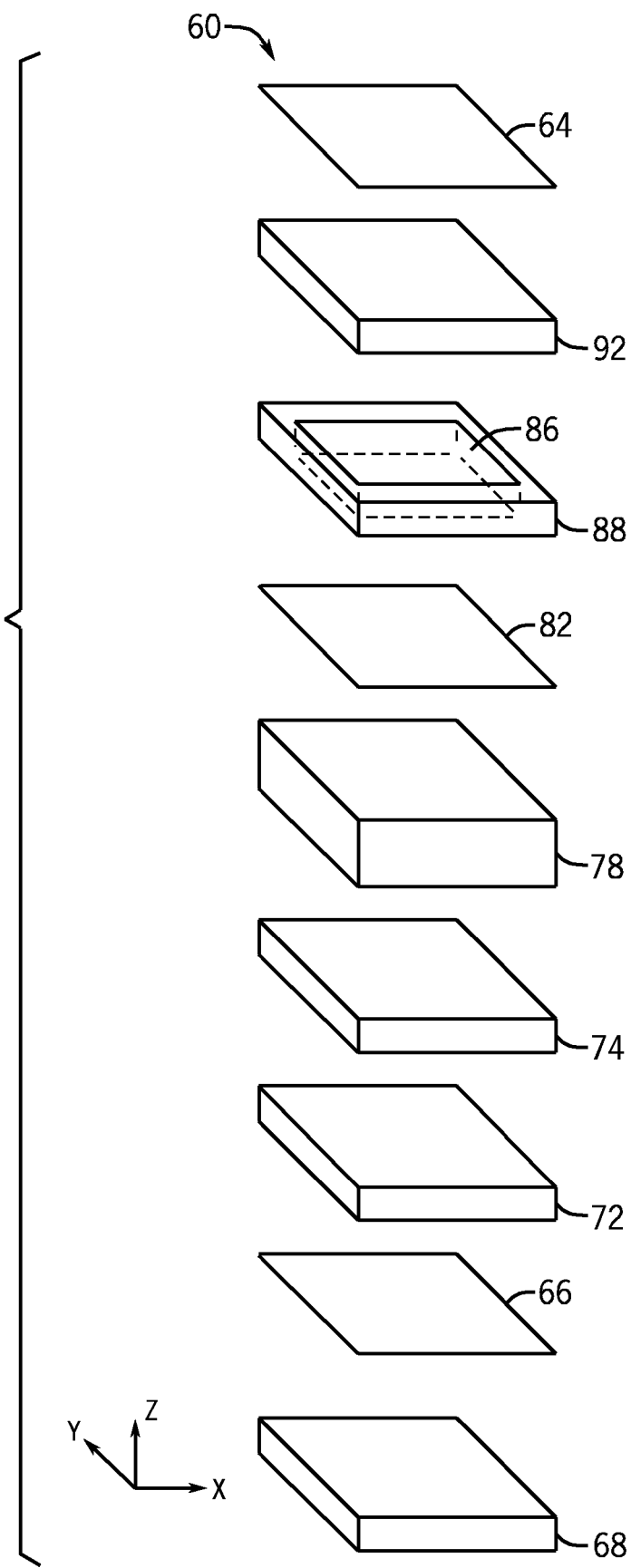

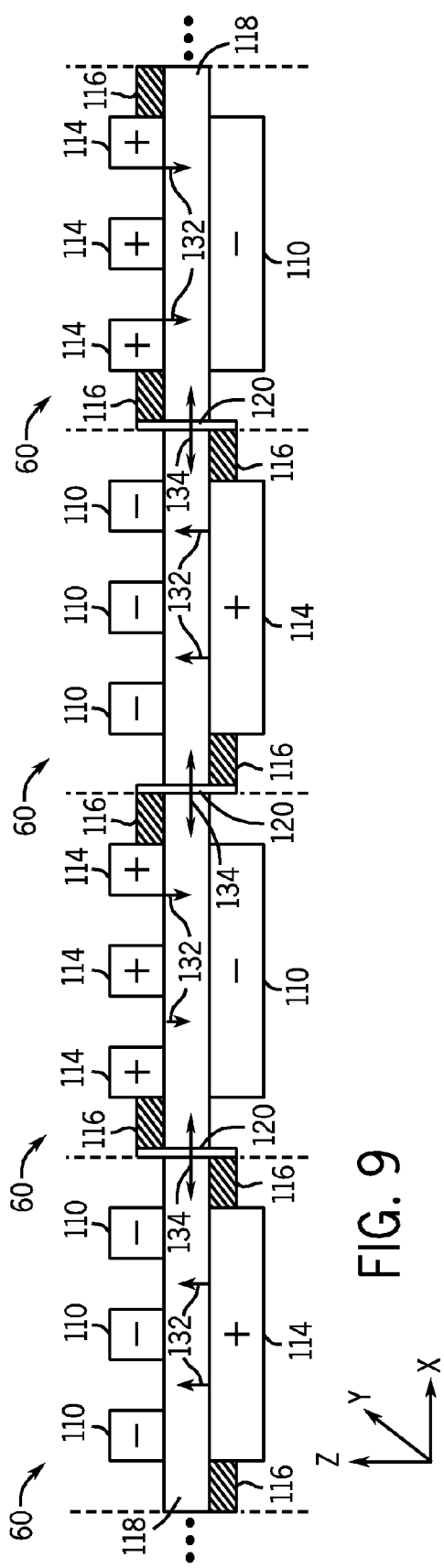
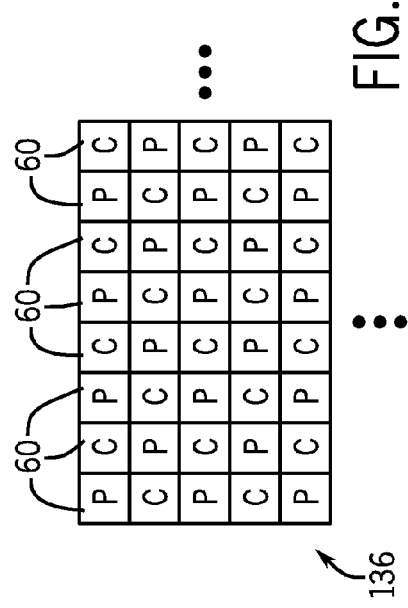
FIG. 9
FIG. 10

FIG. 11

| | $G_{N-1}$ $(-)CE_{N-1}$ | $G_N$ $(-)CE_N$ | $G_{N+1}$ $(-)CE_{N+1}$ | $G_{N+2}$ $(-)CE_{N+2}$ | $G_{N+3}$ $(-)CE_{N+3}$ |
|---|---|---|---|---|---|
| $S_7$ | + | − | + | − | + |
| $S_6$ | − | + | − | + | − |
| $S_5$ | + | − | + | − | + |
| $S_4$ | − | + | − | + | − |
| $S_3$ | + | − | + | − | + |
| $S_2$ | − | + | − | + | − |
| $S_1$ | + | − | + | − | + |
| $S_0$ | − | + | − | + | − |

FIG. 12

LCD ELECTRODE ARRANGEMENT

BACKGROUND

The present disclosure relates generally to display devices and, more particularly, to liquid crystal display (LCD) devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

LCD devices typically include a plurality of picture elements (pixels) arranged in a matrix to display an image that may be perceived by a user. Individual pixels of an LCD device may variably permit light to pass when an electric field is applied to a liquid crystal material in each pixel, which may be generated by a voltage difference between a pixel electrode and a common electrode. Within each pixel, the pixel electrode and the common electrode may be separated by a dielectric passivation layer. Due to the voltage difference between the pixel electrode and common electrode used to generate the electric field, the passivation layer may develop a direct current (DC) bias, or capacitance, that may detrimentally affect the electric field in the pixel. Moreover, because the liquid crystal material in each pixel may deteriorate when a DC voltage is applied for an extended period of time, the polarity of the voltage difference between the pixel electrode and common electrode may be occasionally changed. However, common polarity inversion techniques may result in common voltage loading or may be complex to implement.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a configuration of a pixel array for a liquid crystal display (LCD), which may have reduced direct current (DC) bias characteristics and/or may enable a simplified manner of polarity inversion. In accordance with one embodiment, a device may include a processor, a memory device, and a liquid crystal display having a pixel array including rows and columns of pixels. Each pixel of the pixel array may include a pixel electrode separated from a common electrode by a dielectric passivation layer, and may include a transistor to provide a data signal when the transistor is activated. The pixel array is configured such that a neutral amount of direct current bias is generated on the passivation layer when each row of pixels is activated. The common electrodes of certain pixels may be disposed above their respective pixel electrodes, while the common electrodes of certain other pixels may be disposed below their respective pixel electrodes.

BRIEF DESCRIPTION OF THE DRAWINGS

Various aspects of this disclosure may be better understood upon reading the following detailed description and upon reference to the drawings in which:

FIG. 4 is an exploded view of exemplary layers of a pixel of a liquid crystal display (LCD) panel, in accordance with aspects of the present disclosure;

FIG. 9 is a schematic cross-sectional view of a partial row of pixels of the pixel arrangement of FIG. 6, in accordance with aspects of the present disclosure;

FIG. 10 is a schematic diagram illustrating the pixel arrangement of FIG. 6, in accordance with aspects of the present disclosure;

FIG. 11 is a schematic diagram illustrating the activation of a first frame of pixels using the pixel arrangement of FIG. 6, in accordance with aspects of the present disclosure;

FIG. 12 is a schematic diagram illustrating the activation of a second frame of pixels using the pixel arrangement of FIG. 6, in accordance with aspects of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
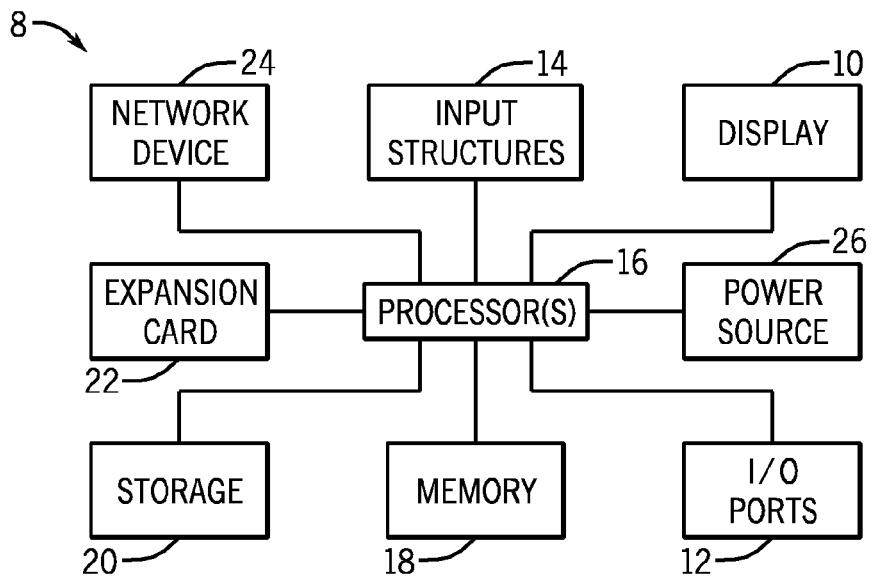
FIG. 1 is a block diagram of exemplary components of an electronic device, in accordance with aspects of the present disclosure.
Figure 3:
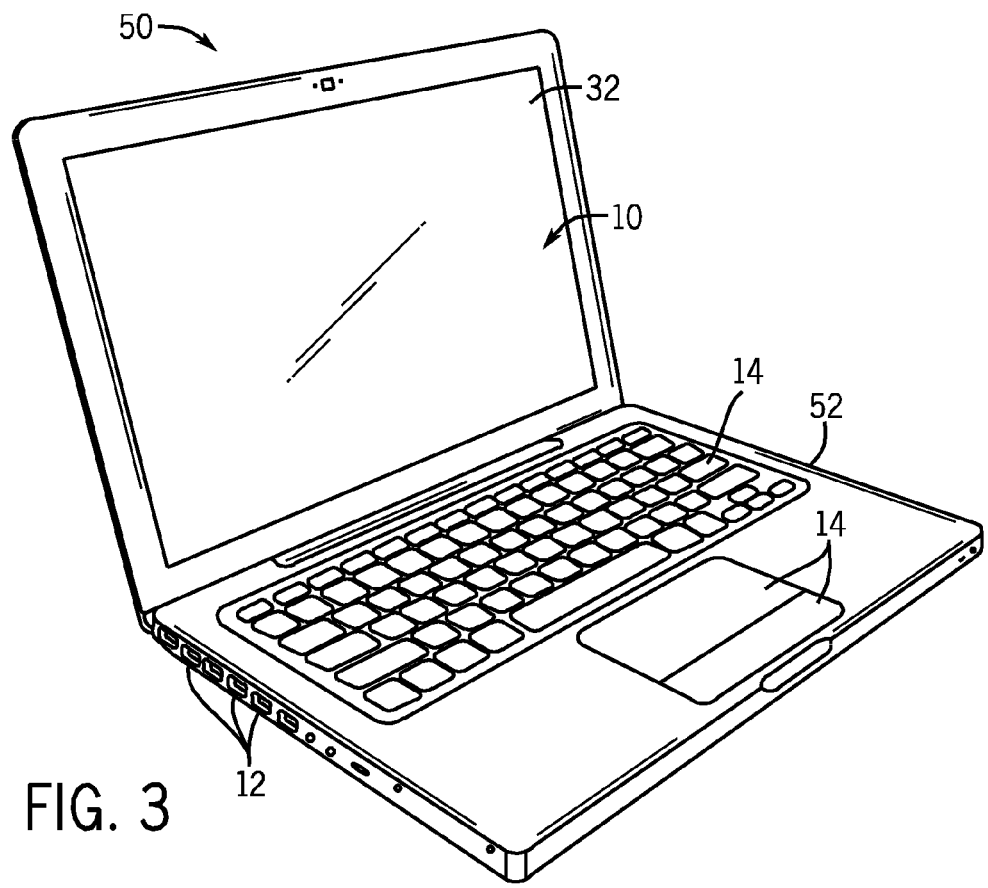
FIG. 3 is a view of a computer in accordance with aspects of the present disclosure.
Figure 2:
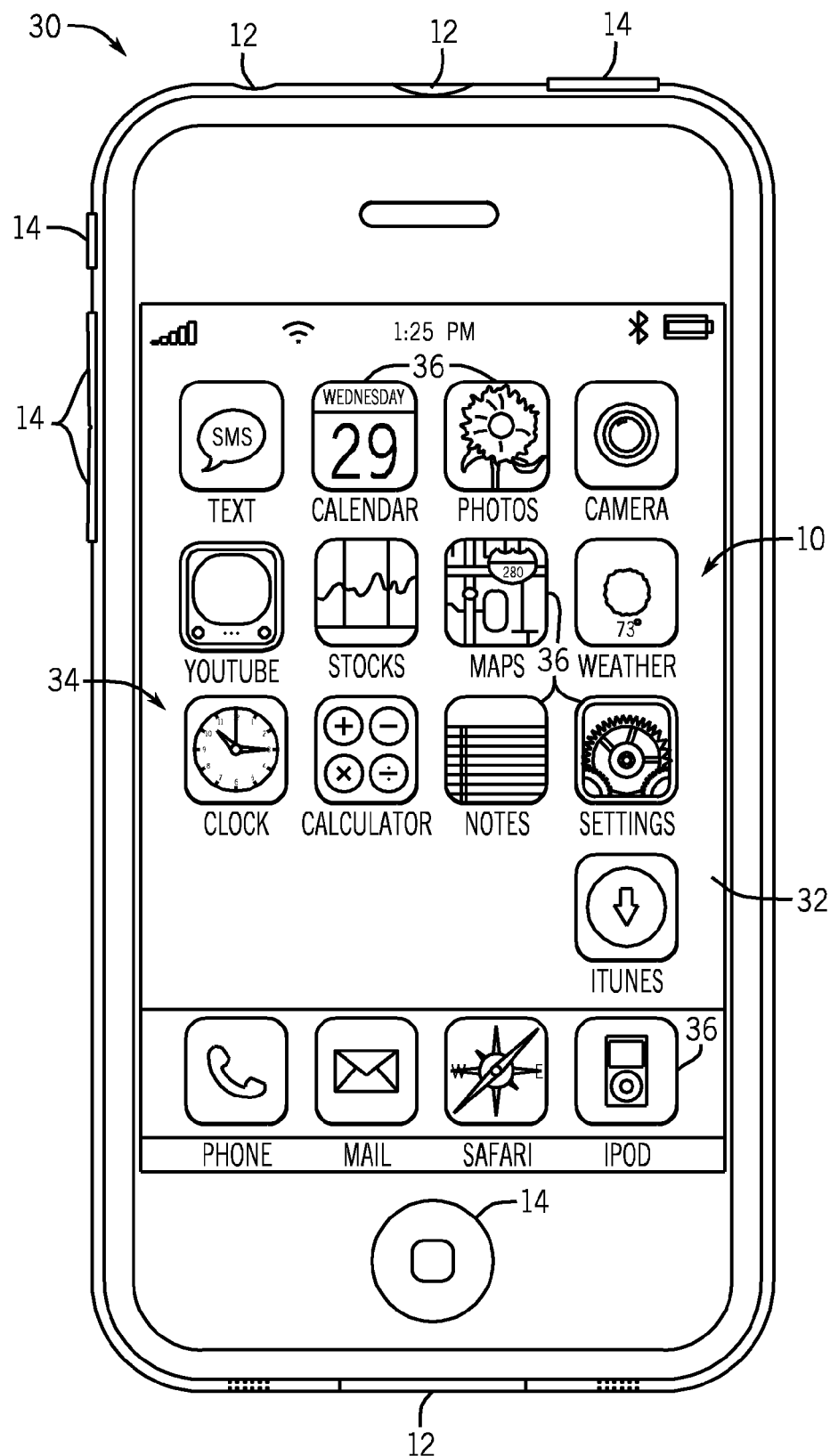
FIG. 2 is a front view of a handheld electronic device in accordance with aspects of the present disclosure.

A general description of suitable electronic devices using LCD displays having pixel arrangements for reduced passivation DC bias and/or polarity inversion is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

FIG. 1 is a block diagram illustrating various components and features of electronic device 8, which may represent, for example, the handheld device depicted in FIG. 2 or the computer depicted in FIG. 3. In the presently illustrated embodiment, electronic device 8 may include components such as display 10, input/output (I/O) ports 12, input structures 14, central processing unit (CPU) 16, memory device 18, non-volatile storage 20, expansion card(s) 22, networking device 24, and power source 26. Display 10 may display images for device 8 and I/O ports 12 may include ports configured to connect to a variety of external devices, such as a power source, headset or headphones. Input structures 14 may enable a user to interact with device 8, and may include the various devices, circuitry, and pathways by which user input or feedback is provided to CPU 16, such as keypads or buttons.

CPU 16 may use data from memory device 18 or non-volatile storage 20 to execute an operating system, programs, GUI, and any other functions of device 8. Memory device 18 may include volatile memory, such as RAM, and/or non-volatile memory, such as ROM. Non-volatile storage 20 may include any persistent form of storage, including, for example, a hard drive or Flash memory. CPU 16 also may receive data through I/O ports 12, expansion card(s) 22, or network device 24, which may represent, for example, one or more network interface cards (NIC) or a network controller. Power source 26 may provide power to device 8 and may include one or more batteries, such as a lithium-ion polymer battery, or an AC power adapter.

FIG. 2 illustrates an electronic device 8 in the form of handheld device 30, here a cellular telephone. It should be noted that while handheld device 30 is provided in the context of a cellular telephone, other types of handheld devices (such as media players for playing music and/or video, personal data organizers, handheld game platforms, and/or combinations of such devices) may also be suitably provided as electronic device 8. Further, handheld device 30 may incorporate the functionality of one or more types of devices, such as a media player, a cellular phone, a gaming platform, a personal data organizer, and so forth.

For example, in the depicted embodiment, handheld device 30 is in the form of a cellular telephone that may provide various additional functionalities (such as the ability to take pictures, record audio and/or video, listen to music, play games, and so forth). As discussed with respect to the general electronic device of FIG. 1, handheld device 30 may allow a user to connect to and communicate through the Internet or through other networks, such as local or wide area networks. Handheld device 30 may also communicate with other devices using short-range connections, such as Bluetooth and near field communication. By way of example, handheld device 30 may be a model of an iPod® or iPhone® available from Apple Inc. of Cupertino, Calif.

Handheld device 30 may include an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within handheld device 30 to facilitate wireless communication. The enclosure may also include user input structures 14 through which a user may interface with the device. Each user input structure 14 may be configured to help control a device function when actuated. For example, in a cellular telephone implementation, one or more input structures 14 may be configured to invoke a "home" screen or menu to be displayed, to toggle between a sleep and a wake mode, to silence a ringer for a cell phone application, to increase or decrease a volume output, and so forth.

LCD 32 may represent display 10 in the depicted embodiment of handheld device 30. LCD 32 may be used to display a graphical user interface (GUI) 34 that allows a user to interact with handheld device 30. GUI 34 may include various layers, windows, screens, templates, or other graphical elements that may be displayed in all, or a portion, of LCD 32. Generally, GUI 34 may include graphical elements that represent applications and functions of the electronic device. The graphical elements may include icons 36 and other images representing buttons, sliders, menu bars, and the like. Icons 36 may correspond to various applications of the electronic device that may open upon selection of each respective icon 36. Icons 36 may be selected via a touch screen included in display 10, or may be selected by one or more input structures 14, such as a wheel or button.

Handheld device 30 also may include various I/O ports 12 that allow connection of handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld device 30 of FIG. 2, electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, electronic device 8 in the form of a computer may be a model of a MacBook®, MacBook® Pro, MacBook Air®, iMac®, Mac® mini, or Mac Pro® available from Apple Inc. By way of example, laptop computer 50 is illustrated in FIG. 3 and represents an embodiment of electronic device 8 in accordance with one embodiment of the present disclosure. Computer 50 includes housing 52, display 10 (such as LCD 32), input structures 14, and I/O ports 12.

In one embodiment, input structures 14 (such as a keyboard and/or touchpad) may enable interaction with computer 50, such as to start, control, or operate a GUI or applications running on computer 50. For example, a keyboard and/or touchpad may allow a user to navigate a user interface or application interface displayed on LCD 32.

As depicted, computer 50 may also include various I/O ports 12 to allow connection of additional devices. For example, computer 50 may include one or more I/O ports 12, such as a USB port or other port, suitable for connecting to another electronic device, a projector, a supplemental display, and so forth. In addition, computer 50 may include network connectivity, memory, and storage capabilities, as described with respect to FIG. 1. As a result, computer 50 may store and execute a GUI and other applications.

With the foregoing discussion in mind, it may be appreciated that electronic device 8 in either the form of handheld device 30 or computer 50 may be provided with display 10 in the form of LCD 32. LCD 32 may be utilized to display the respective operating system and application interfaces running on electronic device 8 and/or to display data, images, or other visual outputs associated with an operation of electronic device 8.

In embodiments in which electronic device 8 includes an LCD 32, LCD 32 may typically include an array or matrix of picture elements (i.e., pixels). In operation, LCD 32 may generally modulate the transmittance of light through each pixel by controlling the orientation of liquid crystal material disposed at each pixel. Based on the orientation of the liquid crystal material, the amount of light emitted or reflected by each pixel may vary. In general, the orientation of the liquid crystals is controlled by a applying an electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Examples of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels. As used herein, the term "pixel" refers to individual unit pixels.

With the foregoing in mind, and turning once again to the figures, FIG. 4 depicts an exploded view of different layers of a pixel of LCD 32. Pixel 60 includes upper polarizing layer 64 and lower polarizing layer 66, which polarize light emitted by backlight assembly 68 or a light-reflective surface. Lower substrate 72 is disposed above polarizing layer 66 and is generally formed from a light-transparent material, such as glass, quartz, and/or plastic.

Thin film transistor (TFT) layer 74 is depicted as being disposed above lower substrate 72. For simplicity of illustration, TFT layer 74 is depicted as a generalized structure in FIG. 4. In practice, TFT layer 74 may itself comprise various conductive, non-conductive, and semiconductive layers and structures which generally form the electrical devices and pathways which drive operation of pixel 60. For example, in an embodiment in which pixel 60 is part of an FFS LCD panel, TFT layer 74 may include the respective data lines, scanning lines, pixel electrodes, and common electrodes (as well as other conductive traces and structures) of pixel 60. Such conductive structures may, in light-transmissive portions of the pixel, be formed using transparent conductive materials, such as indium tin oxide (ITO). In addition, TFT layer 74 may include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate pixel 60, as described in further detail with regard to FIG. 5. TFT layer 74 may also include an alignment layer (formed from polyimide or other suitable materials) at the interface with liquid crystal layer 78.

Liquid crystal layer 78 includes liquid crystal particles or molecules suspended in a fluid or gel matrix. The liquid crystal particles may be oriented or aligned with respect to an electrical field generated by TFT layer 74. The orientation of the liquid crystal particles in liquid crystal layer 78 determines the amount of light transmission through pixel 60. Thus, by modulation of the electrical field applied to liquid crystal layer 78, the amount of light transmitted though pixel 60 may be correspondingly modulated.

Disposed on the other side of liquid crystal layer 78 from TFT layer 74 may be one or more alignment and/or overcoating layers 82 interfacing between liquid crystal layer 78 and overlying color filter 86. Color filter 86, in certain embodiments, may be a red, green, or blue filter, such that each pixel 60 corresponds to a primary color when light is transmitted from backlight assembly 68 through liquid crystal layer 78 and color filter 86.

Color filter 86 may be surrounded by a light-opaque mask or matrix, e.g., black mask 88 which circumscribes the light-transmissive portion of pixel 60. For example, in certain embodiments, black mask 88 may be sized and shaped to define a light-transmissive aperture over liquid crystal layer 78 and around color filter 86 and to cover or mask portions of pixel 60 that do not transmit light, such as the scanning line and data line driving circuitry, the TFT, and the periphery of pixel 60. In the depicted embodiment, upper substrate 92 may be disposed between black mask 88 and color filter 86 and polarizing layer 64. In such an embodiment, upper substrate 92 may be formed from light-transmissive glass, quartz, and/or plastic.

Figure 5:
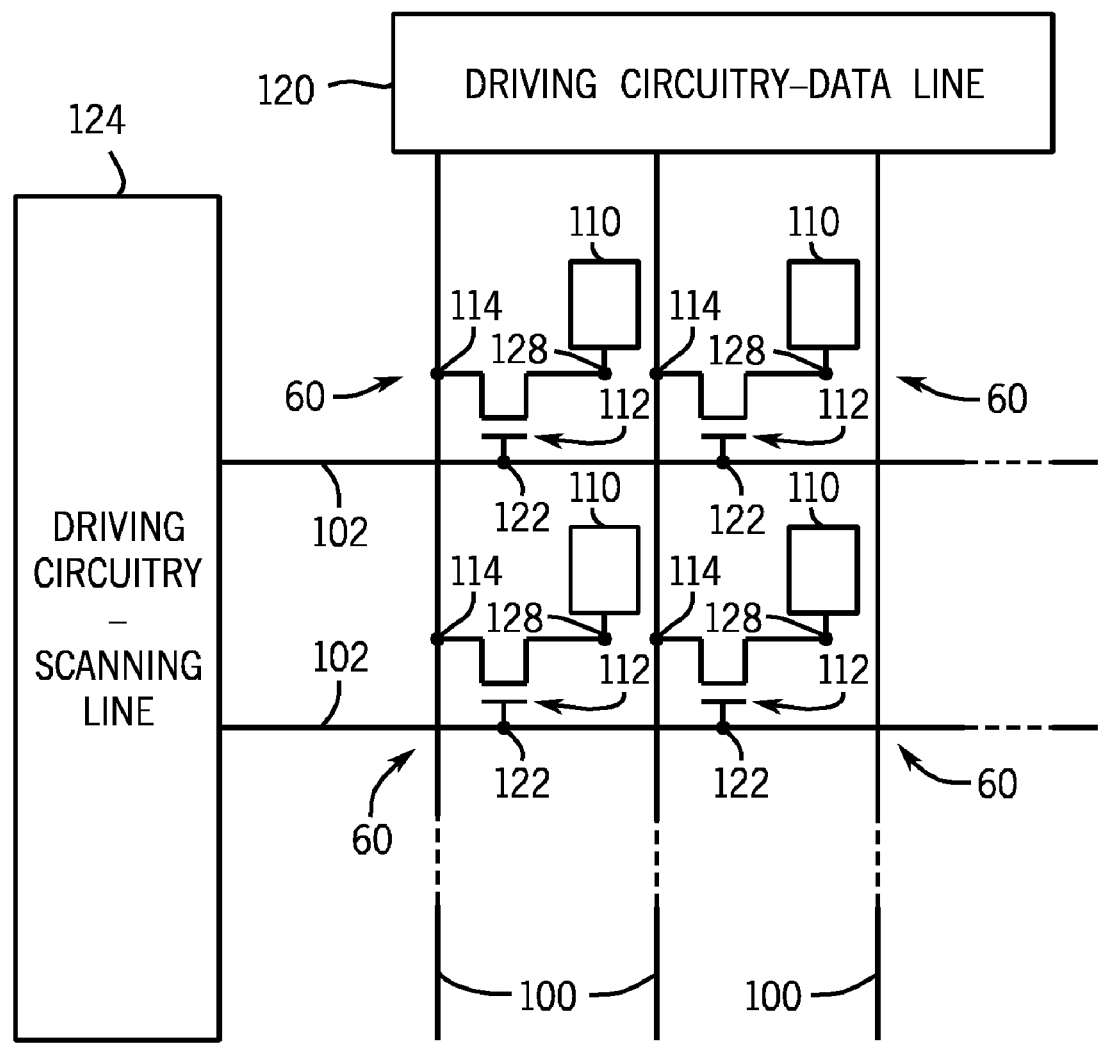
FIG. 5 is a circuit diagram of switching and display circuitry of LCD pixels, in accordance with aspects of the present disclosure.

Referring now to FIG. 5, an example of a circuit view of pixel driving circuitry found in LCD 32 is provided. Such circuitry as depicted in FIG. 5 may be embodied in TFT layer 74 described with respect to FIG. 4. As depicted, pixels 60 may be disposed in a matrix that forms an image display region of an LCD 32. In such a matrix, each pixel 60 may be defined by the intersection of data lines 100 and scanning or gate lines 102.

Each pixel 60 includes pixel electrode 110 and thin film transistor (TFT) 112 for switching pixel electrode 110. In the depicted embodiment, source 114 of each TFT 112 is electrically connected to data line 100, extending from respective data line driving circuitry 120. Similarly, in the depicted embodiment, gate 122 of each TFT 112 is electrically connected to scanning or gate line 102, extending from respective scanning line driving circuitry 124. In the depicted embodiment, pixel electrode 110 is electrically connected to drain 128 of the respective TFT 112.

In one embodiment, data line driving circuitry 120 sends image signals to the pixels via respective data lines 100. Such image signals may be applied by line-sequence, i.e., data lines 100 may be sequentially activated during operation. Scanning lines 102 may apply scanning signals from scanning line driving circuitry 124 to gate 122 of each TFT 112 to which respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at gate 122 of TFT 112. When activated, TFT 112 may store the image signals received via a respective data line 100 as a charge in pixel electrode 110 with a predetermined timing.

The image signals stored at each pixel electrode 110 may be used to generate an electrical field between the respective pixel electrode 110 and a common electrode. Such an electrical field may align liquid crystals within liquid crystal layer 78 (FIG. 4) to modulate light transmission through liquid crystal layer 78. In some embodiments, a storage capacitor may also be provided in parallel to the liquid crystal capacitor formed between pixel electrode 110 and the common electrode to prevent leakage of the stored image signal at pixel electrode 110. For example, such a storage capacitor may be provided between drain 128 of the respective TFT 112 and a separate capacitor line.

Figure 6:
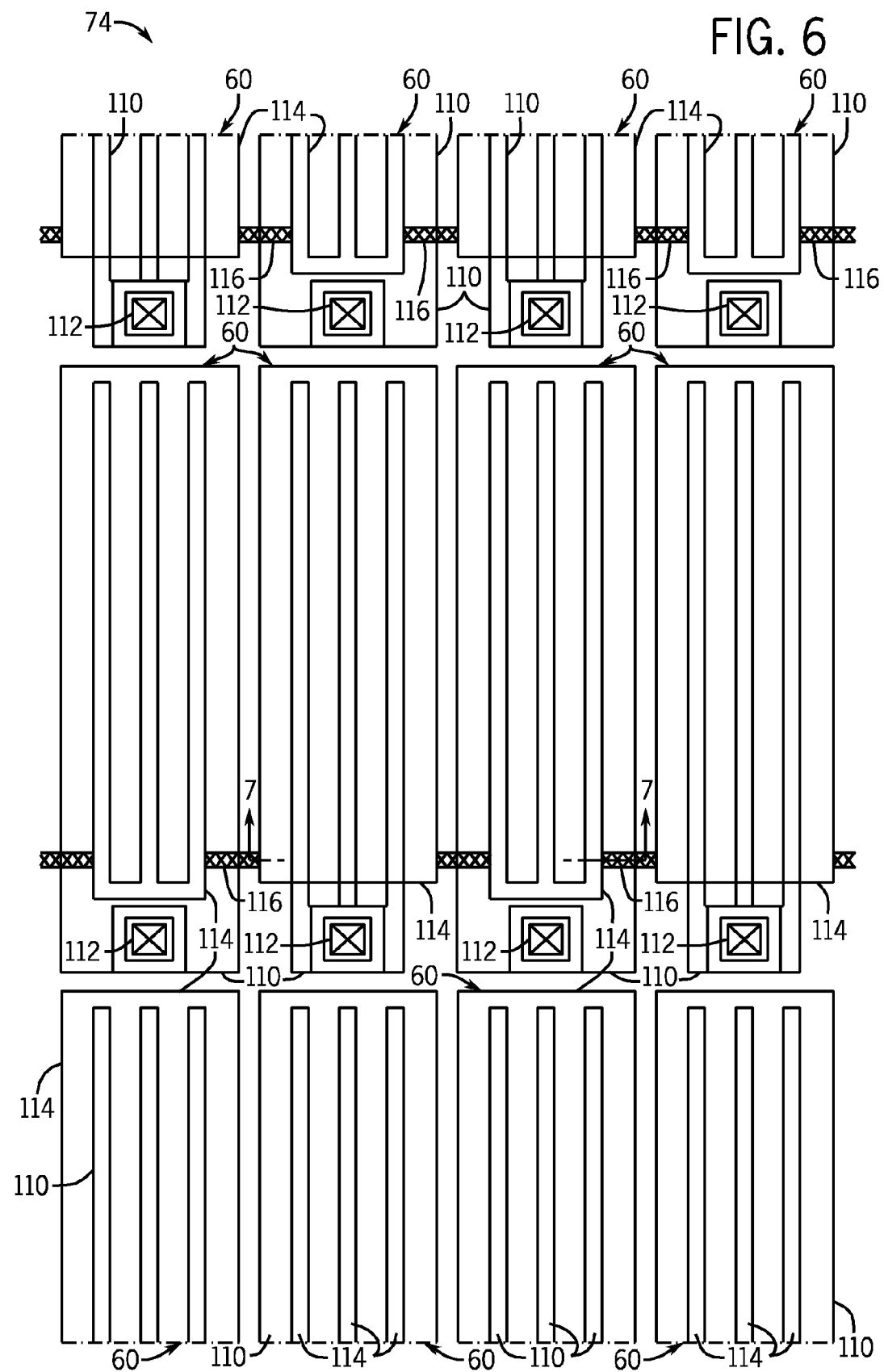
FIG. 6 is a simplified plan view of a pixel arrangement for an LCD panel, in accordance with aspects of the present disclosure.

FIG. 6 is a simplified plan view of an embodiment of TFT layer 74, which generally corresponds to the circuit diagram of FIG. 5. Each pixel 60 of TFT layer 74 includes pixel electrode 110, thin film transistor (TFT) 112 for switching pixel electrode 110, and common electrode 114. In the embodiment of FIG. 6, pixel electrodes 110 of pixels 60 are coupled to respective TFTs 112. When TFT 112 is switched on, pixel electrodes 110 may receive respective data signal voltages in the manner described above with reference to FIG. 5.

As shown in FIG. 6, pixel electrodes 110 may be alternatingly located above or below common electrodes 114 and separated by a light-transmissive passivation layer. Common electrodes 114 in each row of pixels 60 may be supplied a common voltage (Vcom) that transfers from one common electrode 114 to the next via conductive interconnects 116. Conductive interconnects 116 may be composed wholly or partially of indium tin oxide (ITO) and may include one or more conductive vias to pass up or down through layers of TFT layer 74.

Figure 7:
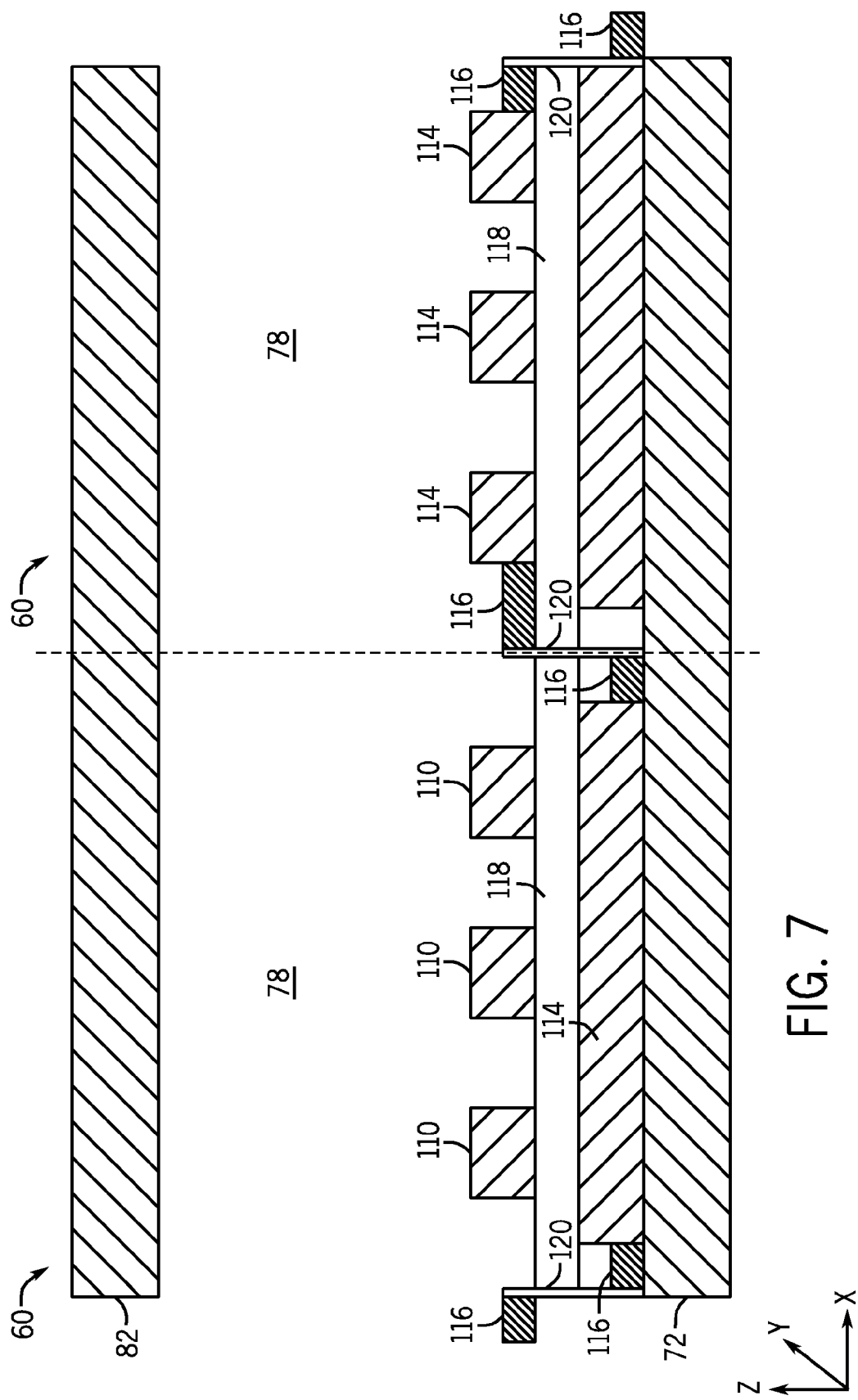
FIG. 7 is a cross-sectional view of two pixels of the pixel arrangement of FIG. 6, in accordance with aspects of the present disclosure.

FIG. 7 is a schematic cross-sectional view along cut lines 7-7 of FIG. 6 of two pixels 60 of the pixel arrangement of FIG. 6. Further included in FIG. 7 are lower substrate 72, liquid crystal layer 78, and alignment and/or overcoating layer 82. As used herein, the term "vertical" refers to the z direction, the term "horizontal" refers to the x direction, the term "above" refers to a higher location in the z direction, and the term "below" refers to a lower location in the z direction. Accordingly, in the embodiment of FIG. 7, common electrode 114 is below pixel electrode 110 in the first of the two illustrated pixels 60, and common electrode 114 is above pixel electrode 110 in the second, separated in each case by dielectric passivation layer 118. To enable the common voltage (Vcom) to pass to each common electrode 114, conductive interconnect 116 joins lower common electrode 114 of the first of the two illustrated pixels 60 and upper common electrode 114 of the second of the two illustrated pixels 60. Conductive interconnect 116 may include any conductive material, including, for example, indium tin oxide (ITO). Via 120 allows a supplied common voltage to pass from a lower portion of conductive interconnect 116 to an upper portion of conductive interconnect 116.

Figure 8:
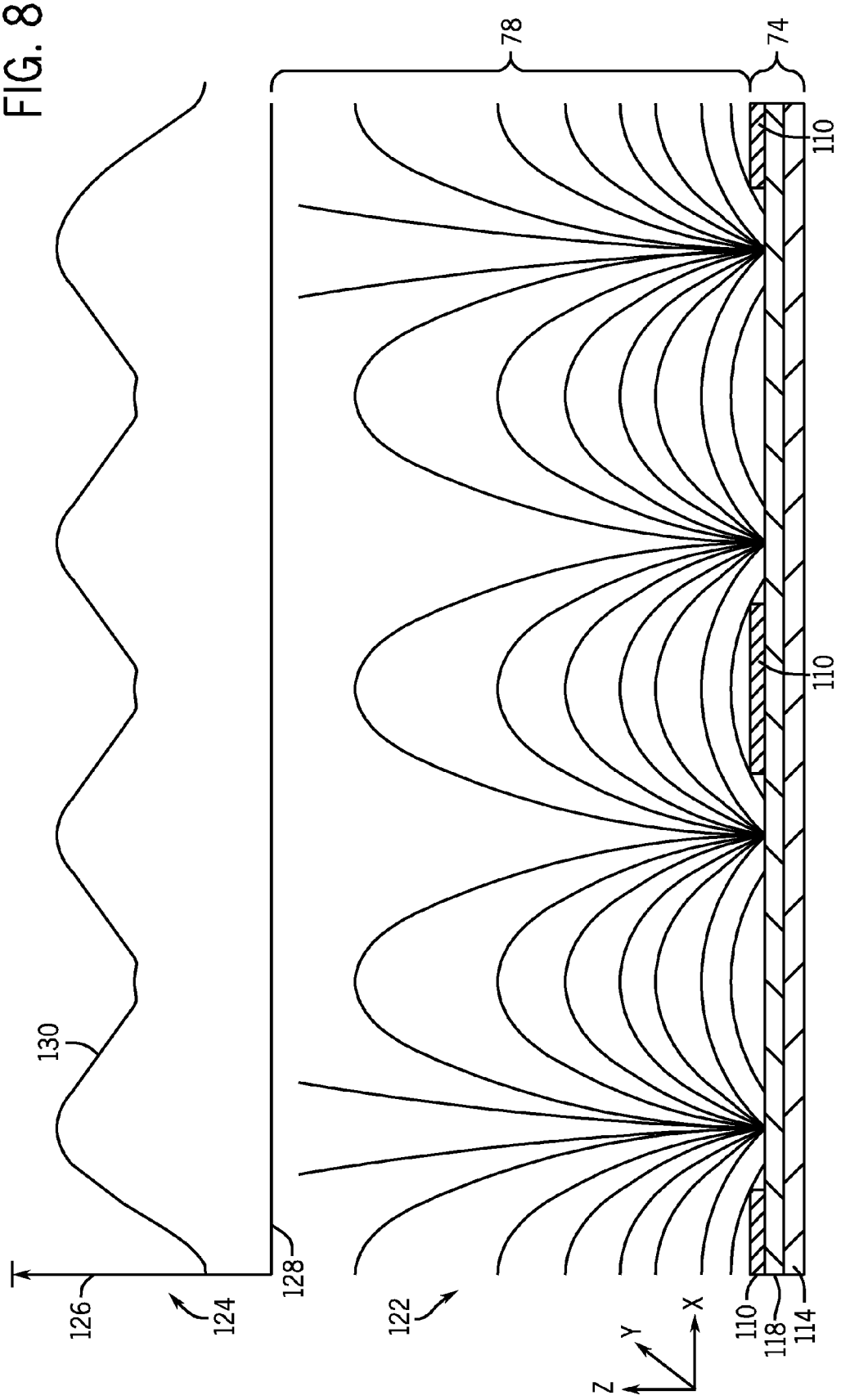
FIG. 8 is a schematic view of the transmittance of light through one of the pixels of FIG. 7, in accordance with aspects of the present disclosure.

When either pixel 60 is activated, pixel electrode 110 may receive a data voltage signal, representing a video signal for display on the pixel 60. As shown in FIG. 8, electric field 122 may form between fingers of pixel electrode 110 and common electrode 114, changing the alignment of liquid crystal layer 78 and allowing an amount of light corresponding to electric field 122 to pass through liquid crystal layer 78.

Graph 124 illustrates the transmittance of light across the width of pixel 60 when electric field 122 has aligned liquid crystal layer 78 to allow light to pass. In graph 124, ordinate 126 illustrates a relative amount of light transmittance through pixel 60, and abscissa 128 represents a distance across the width of pixel 60. Transmittance curve 130 illustrates that in the instant example involving fringe field switching (FFS), the transmittance remains relatively stable across the width of pixel 60.

Electric field 122 may generally achieve a particular transmittance regardless of the polarity of electric field 122. The polarity of electric field 122 may depend on the direction of the voltage difference between pixel electrode 110 and common electrode 114. As such, as described further below, it should be appreciated that as pixel electrodes 110 and common electrodes 114 alternate locations in adjacent pixels 60, the polarities of electric fields 122 of those pixels 60 may also alternate. Moreover, it may be desirable to periodically invert the polarity of electric field 122 to prevent degradation of liquid crystal layer 78. Using techniques described herein, the polarity of electric field 122 may vary based on the data voltage supplied to pixel electrode 110 and the common voltage (Vcom) supplied to common electrode 114.

FIG. 9 is a schematic illustrating a manner of relieving DC bias that may result from accumulated charge on passivation layer 118 using the pixel arrangement of FIG. 6. As noted above with reference to FIG. 7, passivation layer 118 may function as a dielectric between pixel electrode 110 and common electrode 114; the voltage difference between pixel electrode 110 and common electrode 114 generates electric field 122. In the example of FIG. 9, common electrodes 114 have been supplied a common voltage (Vcom) of a positive polarity (e.g., +3 V) and pixel electrodes 110 have been supplied a data signal of a negative polarity. In time, charge accumulation 132 may occur in passivation layer 132 of a particular polarity, which is represented by the direction of arrows illustrating charge accumulation 132.

If charge accumulation 132 is not dissipated, it may alter the voltage difference between pixel electrode 110 and common electrode 114, and thus may alter electric field 122. Because pixel electrodes 110 and common electrodes 114 alternate their respective dispositions relative to passivation layer 118, charge accumulation 132 may oppositely occur in certain adjacent pixels 60. As such, charge accumulation 132 that causes a DC bias of a positive polarity may effectively offset adjacent charge accumulation 132 that causes a DC bias of a negative polarity. Thus, the pixel arrangement of FIG. 6 and related pixel arrangements may result in an approximate charge equalization 134, which may effectively neutralize DC bias that may arise due to charge accumulation 132.

FIG. 10 is a schematic view of pixel array 136 having the pixel arrangement of FIG. 6. In FIG. 10, pixel array 136 includes pixels 60 labeled either "P" or "C" to indicate that the topmost electrode is either pixel electrode 110 ("P") or common electrode 114 ("C"). As illustrated, pixel array 136 alternates such that every directly horizontally or vertically adjacent pixel includes a different topmost electrode.

Figure 11:
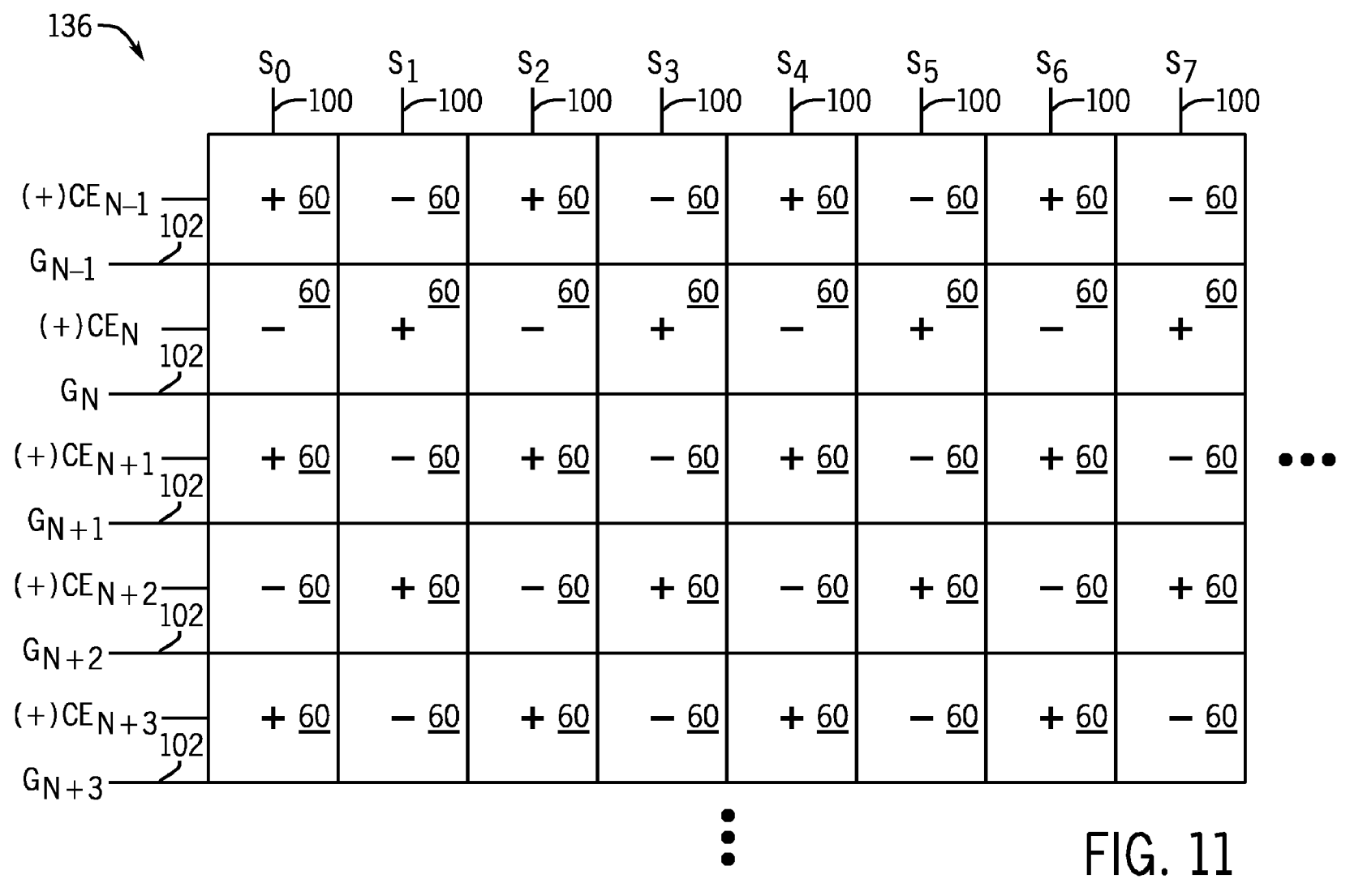

FIGS. 11 and 12 are additional schematic views of pixel array 136 during two consecutive frames of video data and illustrate a simplified manner of effectively performing a dot inversion technique. Particularly, FIG. 11 illustrates the effective polarity of electric field 122 due to the common voltage (Vcom) supplied to each pixel 60 via common electrodes 114 for an even-numbered frame, and FIG. 12 illustrates the effective polarity of electric field 122 due to the common voltage (Vcom) supplied to each pixel 60 for an odd-numbered frame. As used herein, an "effective polarity" signifies a common voltage (Vcom) supplied to common electrode 114 that, depending on whether common electrode 114 is located above or below pixel electrode 110, may cause electric field 122 for a given pixel 60 to have one direction or another. As noted above, the transmittance of one pixel 60 may be maintained during two frames of video data by maintaining the magnitude of electric field 122, though the polarity of electric field 122 may switch. Varying the polarity of electric field 122 may reduce degradation of liquid crystal layer 78.

As shown in FIGS. 11 and 12, each pixel 60 of each row of pixel array 136 may share one respective common electrode 114 (e.g., one of the common electrodes $CE_{N-1}$ through $CE_{N+3}$) and each column may share one respective source or data line 100 (e.g., one of the data lines $S_0$ through $S_7$). Each scanning or gate line 102 (e.g., gate lines $G_{N-1}$ through $G_{N+2}$) may connect to pixels 60 of each row of pixels 60. Turning to FIG. 11, for even-numbered frames of video data, the common voltage (Vcom) supplied to each common electrode 114 may be a single voltage. Thus, for example, common electrodes $CE_{N-1}$ through $CE_{N+3}$ may receive a common voltage (Vcom) (e.g., +3V) that causes electric field 122 to have a positive effective polarity when common electrode 114 is located below pixel electrode 110 and, correspondingly, to have a negative effective polarity when common electrode 114 is located below pixel electrode 110. Each scanning or gate line 102 may supply a scanning signal one row at a time, at which time data signals may be supplied by data lines 100 to pixels 60 in the activated row of pixels 60, until one entire frame of video data has been stored into pixels 60 of pixel array 136. Based on the common voltage (Vcom) supplied to common electrodes 114 and the data signals supplied by data lines 102, electric fields 122 of pixels 60 of pixel array 136 may generally carry the effective polarities illustrated in FIG. 11.

Turning to FIG. 12, for odd-numbered frames of video data, the common voltage (Vcom) supplied to each common electrode 114 may also be a single voltage. Thus, for example, common electrodes $CE_{N-1}$ through $CE_{N+3}$ may receive a common voltage (Vcom) (e.g., -3V) that causes electric field 122 to have a negative effective polarity when common electrode 114 is located below pixel electrode 110 and, correspondingly, to have a positive effective polarity when common electrode 114 is located below pixel electrode 110. Each scanning or gate line 102 may supply a scanning signal one row at a time, at which time data signals may be supplied by data lines 100 to pixels 60 in the activated row of pixels 60, until one entire frame of video data has been stored into pixels 60 of pixel array 136. Based on the common voltage (Vcom) supplied to common electrodes 114 and the data signals supplied by data lines 102, electric fields 122 of pixels 60 of pixel array 136 may generally carry the effective polarities illustrated in FIG. 12.

Figure 13:
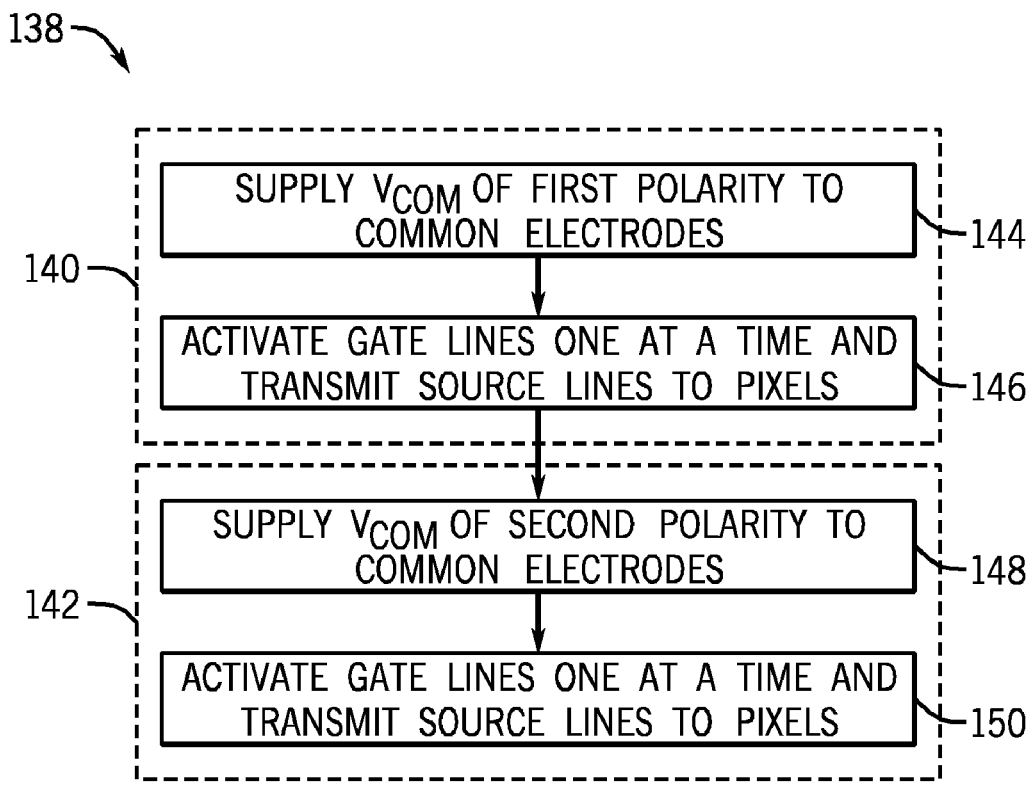
FIG. 13 is a flowchart describing a method of polarity inversion for a frame of pixels using the pixel arrangement of FIG. 6, in accordance with aspects of the present disclosure.

Flowchart 138 of FIG. 13 describes a simplified manner of effectively performing dot inversion using pixel array 136, as generally illustrated above with reference to FIGS. 11 and 12. Flowchart 136 generally includes first subprocess 140 for programming a first frame, and second subprocess 142 for programming a second frame. First subprocess 140 of flowchart 138 may begin with first step 144, in which a common voltage (Vcom) (e.g., +3V) to produce a first effective polarity (e.g., a positive effective polarity) may be supplied to all common electrodes of pixel array 136. Thereafter, as noted by step 146, scanning or gate lines 102 of pixel array 136 may be activated one at a time. While each row of pixels 60 is activated, data signals may be supplied to the activated pixels via source or data lines 100. When all rows of pixels 60 have been activated, first subprocess 140 of programming the first frame of video data may be complete. Performing steps 144 and 146 may cause electric fields 122 of every directly vertically adjacent and directly horizontally adjacent pixel 60 to alternate polarities, thus reducing crosstalk and/or flicker.

Because liquid crystal layer 78 of each pixel 60 may degrade if the polarity of electric field 122 of each pixel 60 is not periodically changed, in second subprocess 142 of flowchart 138, the polarities of electric field 122 may be inverted. Second subprocess 142 of programming the second frame of video data may begin with step 148, in which a common voltage (Vcom) (e.g., -3V) to produce a second effective polarity (e.g., a negative effective polarity) may be supplied to all common electrodes of pixel array 136. Thereafter, in step 150, scanning or gate lines 102 of pixel array 136 may be activated one at a time. While each row of pixels 60 is activated, data signals may be supplied to the activated pixels via source or data lines 100. When all rows of pixels 60 have been activated, second subprocess 142 for programming the second frame of video data may be complete. If, as is likely, additional frames of video data are to be displayed on pixel array 136, the process may thereafter return to step 144 to display the next frame.

Figure 14:
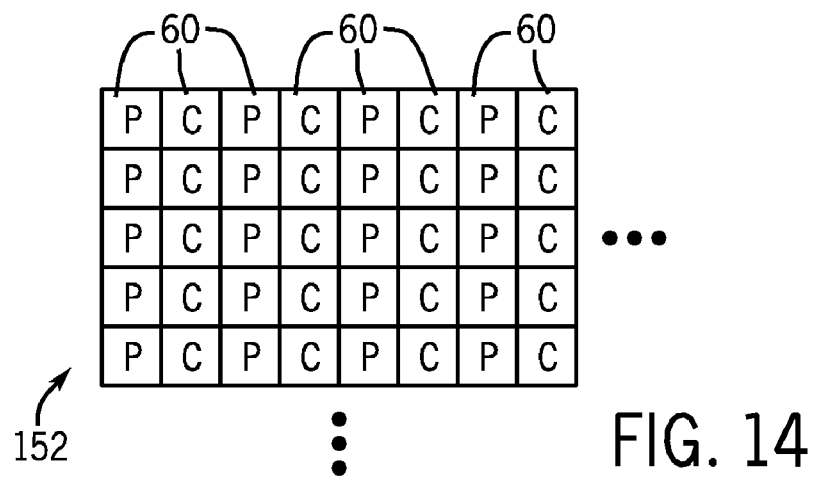
FIG. 14 is a schematic diagram illustrating another pixel arrangement, in accordance with aspects of the present disclosure.

FIG. 14 is a schematic view of alternative pixel array 152 having the pixel arrangement of FIG. 6. In FIG. 14, pixel array 152 includes pixels 60 labeled either "P" or "C" to indicate that the topmost electrode is either pixel electrode 110 ("P") or common electrode 114 ("C"). As illustrated, pixel electrodes 110 and common electrodes 114 of pixel array 152 alternate such that every directly horizontally adjacent pixel includes a different topmost electrode, while every directly vertically adjacent pixel includes the same topmost electrode.

Figure 15:
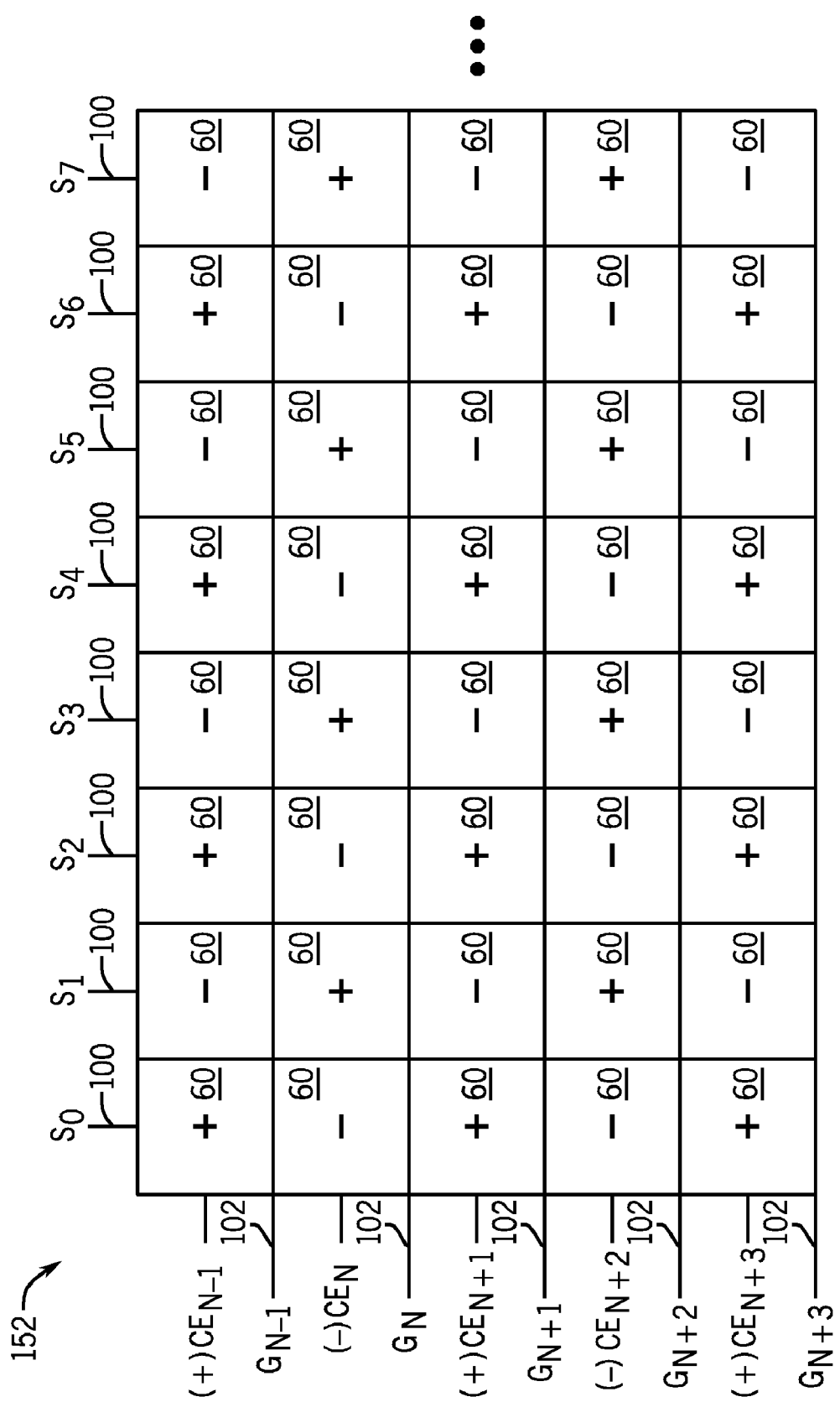
FIG. 15 is a schematic diagram illustrating the activation of a first frame of pixels using the pixel arrangement of FIG. 14, in accordance with aspects of the present disclosure.
Figure 16:
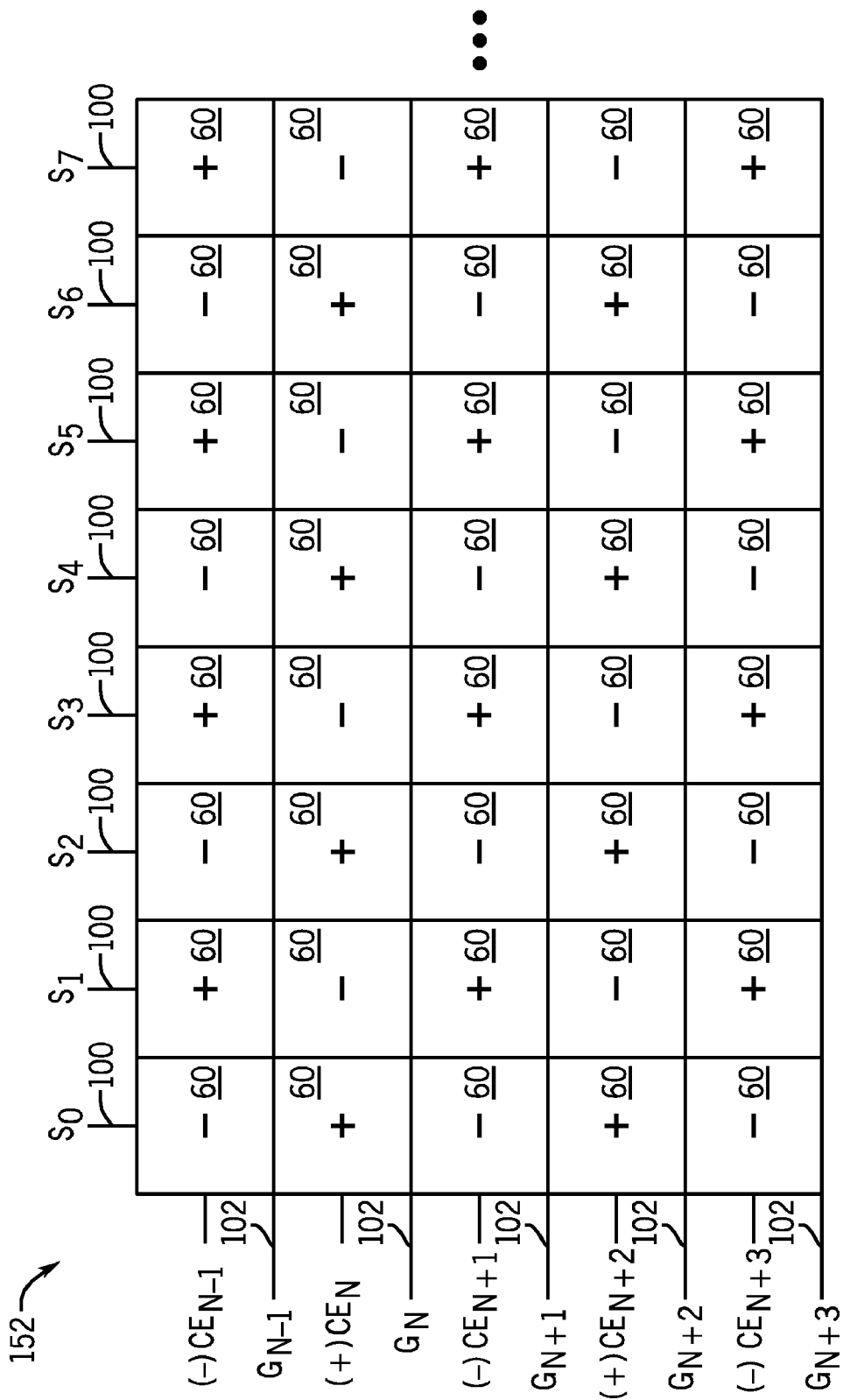
FIG. 16 is a schematic diagram illustrating the activation of a second frame of pixels using the pixel arrangement of FIG. 14, in accordance with aspects of the present disclosure.

FIGS. 15 and 16 are additional schematic views of pixel array 152 during two consecutive frames of video data and may illustrate a simplified manner of effectively performing a dot inversion technique. Particularly, FIG. 15 illustrates the effective polarity of electric field 122 due to the common voltage (Vcom) supplied to each pixel 60 via common electrodes 114 for an even-numbered frame, and FIG. 12 illustrates the effective polarity of electric field 122 due to the common voltage (Vcom) supplied to each pixel 60 for an odd-numbered frame. As used herein, an "effective polarity" signifies a common voltage (Vcom) supplied to common electrode 114 that, depending on whether common electrode 114 is located above or below pixel electrode 110, may cause electric field 122 for a given pixel 60 to have one direction or another. As noted above, the transmittance of one pixel 60 may be maintained during two frames of video data by maintaining the magnitude of electric field 122, though the polarity of electric field 122 may switch. Varying the polarity of electric field 122 may reduce degradation of liquid crystal layer 78.

As shown in FIGS. 15 and 16, each pixel 60 of each row of pixel array 152 may share one respective common electrode 114 (e.g., one of the common electrodes $CE_{N-1}$ through $CE_{N+3}$) and each column may share one respective source or data line 100 (e.g., one of the data lines $S_0$ through $S_7$). Each scanning or gate line 102 (e.g., gate lines $G_{N-1}$ through $G_{N+2}$) may connect to pixels 60 of each row of pixels 60. Turning to FIG. 15, for even-numbered frames of video data, the common voltage (Vcom) supplied to each common electrode 114 may alternate between voltages calculated to produce a positive effective polarity or a negative effective polarity. Thus, for example, common electrodes $CE_{N-1}$, $CE_{N+1}$, $CE_{N+3}$, etc. may receive a common voltage (Vcom) (e.g., +3V) that causes electric field 122 to have a positive effective polarity when common electrode 114 is located below pixel electrode 110 and, correspondingly, to have a negative effective polarity when common electrode 114 is located below pixel electrode 110. Similarly, common electrodes $CE_N$, $CE_{N+2}$, etc. may receive a common voltage (Vcom) (e.g., −3V) that causes electric field 122 to have a negative effective polarity when common electrode 114 is located below pixel electrode 110 and, correspondingly, to have a positive effective polarity when common electrode 114 is located below pixel electrode 110. Each scanning or gate line 102 may supply a scanning signal one row at a time, at which time data signals may be supplied by data lines 100 to pixels 60 in the activated row of pixels 60, until one entire frame of video data has been stored into pixels 60 of pixel array 152. Based on the common voltage (Vcom) supplied to common electrodes 114 and the data signals supplied by data lines 102, electric fields 122 of pixels 60 of pixel array 152 may generally carry the effective polarities illustrated in FIG. 15.

Turning to FIG. 16, for odd-numbered frames of video data, the common voltage (Vcom) supplied to each common electrode 114 may similarly alternate between voltages calculated to produce a positive effective polarity or a negative effective polarity. As illustrated in FIG. 16, for example, common electrodes $CE_{N-1}$, $CE_{N+1}$, $CE_{N+3}$, etc. may receive a common voltage (Vcom) (e.g., −3V) that causes electric field 122 to have a negative effective polarity when common electrode 114 is located below pixel electrode 110 and, correspondingly, to have a positive effective polarity when common electrode 114 is located below pixel electrode 110. Similarly, common electrodes $CE_N$, $CE_{N+2}$, etc. may receive a common voltage (Vcom) (e.g., +3V) that causes electric field 122 to have a positive effective polarity when common electrode 114 is located below pixel electrode 110 and, correspondingly, to have a negative effective polarity when common electrode 114 is located below pixel electrode 110. Each scanning or gate line 102 may supply a scanning signal one row at a time, at which time data signals may be supplied by data lines 100 to pixels 60 in the activated row of pixels 60, until one entire frame of video data has been stored into pixels 60 of pixel array 152. Based on the common voltage (Vcom) supplied to common electrodes 114 and the data signals supplied by data lines 102, electric fields 122 of pixels 60 of pixel array 152 may generally carry the effective polarities illustrated in FIG. 16, which may be an inversion of those illustrated in FIG. 15.

Figure 17:
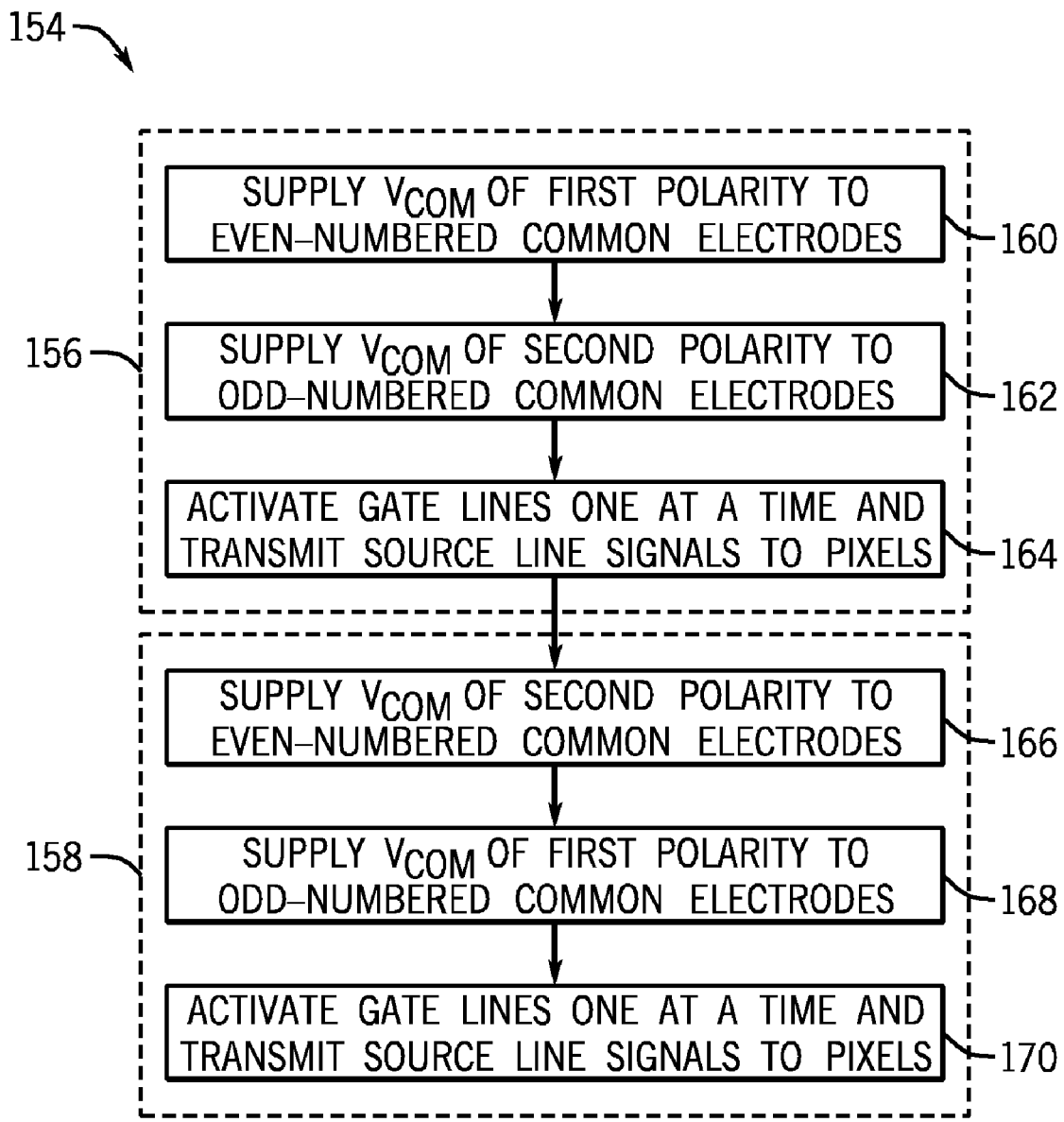
FIG. 17 is a flowchart describing a method of polarity inversion for a frame of pixels using the pixel arrangement of FIG. 14, in accordance with aspects of the present disclosure.

Flowchart 154 of FIG. 17 describes a simplified manner of effectively performing dot inversion using pixel array 152 as generally illustrated above with reference to FIGS. 15 and 16. Flowchart 154 includes first subprocess 156 for programming a first frame, and second subprocess 158 for programming a second frame. First subprocess 156 of flowchart 154 may begin with first step 160, in which a common voltage (Vcom) (e.g., +3V) to produce a first effective polarity (e.g., a positive effective polarity) may be supplied to even-numbered common electrodes 114 of pixel array 152. In step 162, a common voltage (Vcom) (e.g., −3V) may be supplied to odd-numbered common electrodes 114 produce a second effective polarity (e.g., a negative effective polarity). Thereafter, as noted by step 164, scanning or gate lines 102 of pixel array 152 may be activated one at a time. While each row of pixels 60 is activated, data signals may be supplied to the activated pixels via source or data lines 100. When all rows of pixels 60 have been activated, first subprocess 156 for programming the first frame of video data may be complete. Performing steps 160-164 may cause electric fields 122 for every directly vertically adjacent and directly horizontally adjacent pixel 60 to alternate polarities, thus reducing crosstalk and/or flicker.

Because liquid crystal layer 78 of each pixel 60 may degrade if the polarity of electric field 122 of each pixel 60 is not periodically changed, in second subprocess 158 of flowchart 154, the polarities of electric field 122 may be inverted. Second subprocess 158 for programming the second frame of video data may begin with step 166, in which a common voltage (Vcom) (e.g., −3V) to produce the second effective polarity (e.g., a negative effective polarity) may be supplied to even-numbered common electrodes 114 of pixel array 152. In step 168, a common voltage (Vcom) (e.g., +3V) may be supplied to odd-numbered common electrodes 114 to produce the first effective polarity (e.g., a positive effective polarity). Thereafter, in step 170, scanning or gate lines 102 of pixel array 152 may be activated one at a time. While each row of pixels 60 is activated, data signals may be supplied to the activated pixels via source or data lines 100. When all rows of pixels 60 have been activated, second subprocess 158 for programming the second frame of video data may be complete. If, as is likely, additional frames of video data are to be displayed on pixel array 152, the process may thereafter return to step 160 to display the next frame.

The examples discussed above describe certain configurations of pixel arrays in which pixel electrodes 110 and common electrodes 114 may vary in relative location to one another within various pixels 60. However, the above-described embodiments are not exhaustive and do not describe every possible pixel array configuration. Indeed, any number of pixels 60 in a pixel array may include a particular disposition of pixel electrodes 110 to common electrodes 114. For example, a first predetermined number of consecutive pixels 60 in a given row of pixels 60 may include common electrodes 114 beneath pixel electrodes 110, while a second predetermined number of consecutive pixels 60 in the row of pixels 60 may include common electrodes 114 above pixel electrodes 110. In another example, each consecutive group of three pixels 60 in a row of pixels 60 may include two common electrodes 114 beneath two pixel electrodes 110 and one common electrode 114 above pixel electrode 110.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display panel comprising:
a pixel array including rows and columns of pixels, each pixel including:
a pixel electrode;
a common electrode;
a portion of a passivation layer shared by a plurality of the pixels,
wherein the portion of the passivation layer is disposed between the pixel electrode and the common electrode; and
a transistor configured to pass a data signal from a data line to the pixel electrode when the transistor is activated;
wherein the pixel array is configured such that, upon activation of the transistors of two pixels of the plurality of pixels, a direct current bias on the portion of the passivation layer of a first of the two pixels is at least partially offset by a direct current bias on the portion of the passivation layer of a second of the two pixels.

2. The electronic display panel of claim 1, wherein the pixel electrode of the first of the two pixels is disposed above the common electrode of the first of the two pixels and wherein the common electrode of the second pixel is disposed above the pixel electrode of the second pixel.

3. The electronic display panel of claim 1, wherein the pixel array includes a row of pixels having a first plurality of pixels and a second plurality of pixels, wherein the pixel electrodes of the first plurality of pixels are disposed above the respective common electrodes of the first plurality of pixels and wherein the common electrodes of the second plurality of pixels are disposed above the respective pixel electrodes of the second plurality of pixels.

4. The electronic display panel of claim 3, wherein the first plurality of pixels includes all odd-numbered pixels of the row of pixels and wherein the second plurality of pixels includes all even-numbered pixels of the row of pixels.

5. The electronic display panel of claim 3, wherein the first plurality of pixels includes every first and third pixel of each of a consecutive series of groups of three consecutive pixels of the row of pixels and wherein the second plurality of pixels includes every second pixel of each of the consecutive series of groups of three consecutive pixels of the row of pixels.

6. The electronic display panel of claim 1, wherein the pixel array includes a column of pixels having a first plurality of pixels and a second plurality of pixels, wherein the pixel electrodes of the first plurality of pixels are above the respective common electrodes of the first plurality of pixels and wherein the common electrodes of the second plurality of pixels are above the respective pixel electrodes of the second plurality of pixels.

7. The electronic display panel of claim 6, wherein the first plurality of pixels includes all odd-numbered pixels of the column of pixels and the second plurality of pixels includes all even-numbered pixels of the column of pixels.

8. A device comprising:
a processor;
a memory device operably coupled to the processor and configured to store video data; and
a liquid crystal display configured to display the video data by one video frame at a time, the liquid crystal display having a pixel array including rows and columns of pixels, each pixel including:
a pixel electrode;
a common electrode configured to generate an electric field in conjunction with the pixel electrode;
a portion of a dielectric passivation layer shared by the pixels of the pixel array, wherein the portion of the dielectric passivation layer is disposed between the pixel electrode and the common electrode; and
a transistor having a gate connected to one of a plurality of gate lines of the pixel array and a source connected to one of a plurality of data lines of the pixel array, wherein the transistor is configured to provide a data signal from the source line to the pixel electrode when a scanning signal is received on the gate line;
wherein the pixels of each row of the pixel array are configured to cause a neutral amount of direct current bias on the dielectric passivation layer when the pixels of each row of the pixel array receive a scanning signal and a data signal.

9. The device of claim 8, wherein the portions of the dielectric passivation layer associated with a first plurality of pixels of a row of pixels of the pixel array are configured to obtain a charge accumulation of an opposite polarity from that of the portions of the dielectric passivation layer associated with a second plurality of pixels of the row of pixels of the pixel array.

10. The device of claim 9, wherein the first plurality of pixels includes all odd-numbered pixels of the row of pixels and wherein the second plurality of pixels includes all even-numbered pixels of the row of pixels.

11. The device of claim 8, wherein the pixel electrodes of a first plurality of pixels of each row of pixels are disposed above the respective common electrodes of the first plurality of pixels of each row of pixels and wherein the common electrodes of a second plurality of pixels of each row of pixels are disposed above the respective pixel electrodes of the second plurality of pixels, wherein the first plurality of pixels is approximately equal to the second plurality of pixels.

12. The device of claim 11, wherein, for even-numbered video frames, the common electrodes of the first plurality of pixels of each row of pixels and the common electrodes of the second plurality of pixels of each row of pixels are configured to receive a first common voltage and wherein, for odd-numbered video frames, the common electrodes of the first plurality of pixels of each row of pixels and the common electrodes of the second plurality of pixels of each row of pixels are configured to receive a second common voltage.

13. The device of claim 12, wherein the first common voltage and the second common voltage are of opposite polarities.

14. The device of claim 12, wherein the first plurality of pixels includes all odd-numbered pixels of each even-numbered row of pixels and all even-numbered pixels of each odd-numbered row of pixels, and wherein the second plurality of pixels includes all even-numbered pixels of each even-numbered row of pixels and all odd-numbered pixels of each odd-numbered row of pixels.

15. A display panel comprising:
a pixel array including rows and columns of pixels, each pixel including:
an upper electrode;
a portion of a dielectric layer shared by a plurality of pixels, wherein the portion of the dielectric layer is disposed beneath the upper electrode;
a lower electrode disposed beneath the portion of the dielectric layer; and
a transistor configured to provide a data signal from a data line to one of either the upper electrode or the lower electrode when the transistor is activated;
wherein the upper electrode of the pixel is configured to receive a common voltage when the transistor is configured to provide the data signal to the lower electrode and wherein the lower electrode is configured to receive the common voltage when the transistor is configured to provide the data signal to the upper electrode;
wherein the transistor of a first pixel of the pixel array is configured to provide the data signal to the upper electrode of the first pixel and wherein the transistor of a second pixel of the pixel array is configured to provide the data signal to the lower electrode of the second pixel.

16. The electronic display panel of claim 15, wherein the first pixel and the second pixel are adjacent and wherein the lower electrode of the first pixel is electrically coupled to the upper electrode of the second pixel.

17. The electronic display panel of claim 15, wherein a conductive interconnect electrically couples the lower electrode of the first pixel and the upper electrode of the second pixel, wherein the conductive interconnect includes a horizontal component that comprises indium tin oxide and a vertical component that comprises indium tin oxide through a via that passes through the dielectric layer.

18. The electronic display panel of claim 15, wherein the transistor of a third pixel of the pixel array is configured to provide the data signal to the upper electrode of the first pixel, wherein the first pixel, the second pixel, and the third pixel are consecutive pixels in a row of pixels of the pixel array.

19. The electronic display panel of claim 15, wherein the transistors of a first plurality of consecutive pixels of the pixel array are configured to provide the data signal to the respective upper electrodes of the first plurality of consecutive pixels and wherein the transistors of a second plurality of consecutive pixels of the pixel array are configured to provide the data signal to the respective lower electrodes of the second plurality of consecutive pixels, wherein the first plurality of consecutive pixels and the second plurality of consecutive pixels are adjacent to one another in a row of pixels of the pixel array.

20. The electronic display panel of claim 15, wherein the pixel array is configured such that, when the transistors of the first pixel and of the second pixel are activated, a direct current bias on the portion of the dielectric layer of the first pixel is at least partially offset by a direct current bias on the portion of the dielectric layer of the second pixel.

21. A method of controlling a liquid crystal display comprising:
supplying a single common voltage to all common electrodes of a pixel array, wherein the pixel array includes rows and columns of pixels and wherein each pixel of the pixel array is configured to receive a data signal onto a pixel electrode and to generate an electric field based on the voltage of the data signal and the common voltage when the respective pixel is activated; and
activating each pixel of the pixel array one row at a time until all the pixels of the pixel array have been activated for a first video frame, wherein the pixel array is configured such that, when all the pixels of the pixel array have been activated for the first video frame, the electric fields of all horizontally adjacent and vertically adjacent pixels are of opposite polarities.

22. The method of claim 21, wherein the single common voltage is supplied to all the common electrodes of the pixel array, wherein the common electrodes of the pixels of the pixel array are disposed either above or below the respective pixel electrodes, wherein the common electrodes of all horizontally adjacent and vertically adjacent pixels of the pixel array are of opposite dispositions.

23. The method of claim 21, comprising, after all the pixels of the pixel array have been activated for the first video frame, supplying another single common voltage to all the common electrodes of the pixel array, wherein the other single common voltage is of the opposite polarity of the single common voltage, and comprising activating each pixel of the pixel array one row at a time until all the pixels of the pixel array have been activated for a second video frame.

24. A method of controlling a liquid crystal display comprising:
supplying a common voltage of a first polarity to common electrodes of pixels of even-numbered rows of a pixel array, wherein the common electrodes of a first plurality of the pixels of the even-numbered rows are disposed above respective pixel electrodes of the first plurality of pixels of the even-numbered rows and wherein the common electrodes of a second plurality of the pixels of the even-numbered rows are disposed above respective pixel electrodes of the second plurality of pixels of the even-numbered rows;
supplying a common voltage of a second polarity to common electrodes of pixels of odd-numbered rows of a pixel array, wherein the common electrodes of a first plurality of the pixels of the odd-numbered rows are disposed above respective pixel electrodes of the first plurality of pixels of the odd-numbered rows and wherein the common electrodes of a second plurality of the pixels of the odd-numbered rows are disposed above respective pixel electrodes of the second plurality of pixels of the odd-numbered rows; and
activating each row of pixels of the pixel array one at a time until all rows have been activated for a first video frame.

25. The method of claim 24, comprising, after all rows have been activated for the first video frame, supplying the common voltage of the first polarity to the common electrodes of the odd-numbered rows of the pixel array, supplying the common voltage of the second polarity to the common electrodes of the even-numbered rows of the pixel array, and activating each row of pixels of the pixel array one at a time until all rows have been activated for a second video frame.

* * * * *